(12) United States Patent
Pentapati et al.

(10) Patent No.: US 9,291,405 B2
(45) Date of Patent: Mar. 22, 2016

(54) BATTERY PACK LIQUID CHANNEL AND COLDPLATE COOLING SYSTEM

(75) Inventors: Sai K. Pentapati, Rochester Hills, MI (US); Bhaskara Boddakayala, Canton, MI (US); Vineeth Seshadri Kallur, Ypsilanti, MI (US); Patrick Daniel Maguire, Ann Arbor, MI (US); Steven F. Chorian, Canton, MI (US); Josephine S. Lee, Novi, MI (US); Edward Vann Decker, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 616 days.

(21) Appl. No.: 13/196,000

(22) Filed: Aug. 2, 2011

(65) Prior Publication Data
US 2013/0034767 A1 Feb. 7, 2013

(51) Int. Cl.
| | |
|---|---|
| *H01M 10/50* | (2006.01) |
| *F28F 3/12* | (2006.01) |
| *F28F 9/02* | (2006.01) |
| *H01M 10/625* | (2014.01) |
| *H01M 10/6556* | (2014.01) |
| *H01M 10/6568* | (2014.01) |
| *H01M 10/6554* | (2014.01) |
| *H01M 10/613* | (2014.01) |

(52) U.S. Cl.
CPC . *F28F 3/12* (2013.01); *F28F 9/026* (2013.01); *H01M 10/613* (2015.04); *H01M 10/625* (2015.04); *H01M 10/6554* (2015.04); *H01M 10/6556* (2015.04); *H01M 10/6568* (2015.04)

(58) Field of Classification Search
CPC ............ H01M 10/50; H01M 10/5004; H01M 10/5057; H01M 10/5077; H01M 10/5016; F28D 15/00; C09K 5/10

USPC ........... 429/120, 62, 71, 82, 831; 165/104.19, 165/104.28, 104.33
See application file for complete search history.

(56) References Cited

U.S. PATENT DOCUMENTS

| | | | |
|---|---|---|---|
| 6,130,003 A | 10/2000 | Etoh et al. | |
| 7,427,156 B2 | 9/2008 | Ambrosio et al. | |
| 2009/0258289 A1 | 10/2009 | Weber et al. | |
| 2010/0032147 A1* | 2/2010 | Valenzuela | 165/163 |

FOREIGN PATENT DOCUMENTS

| | | |
|---|---|---|
| CN | 101557004 A | 10/2009 |
| DE | 102008059955 A1 | 6/2010 |
| EP | 1 753 069 B1 | 6/2010 |

OTHER PUBLICATIONS

Office Action of Sep. 21, 2015 in Chinese App. No. 201210265406.3.

* cited by examiner

*Primary Examiner* — Raymond Alejandro
(74) *Attorney, Agent, or Firm* — David B. Kelley; Brooks Kushman P.C.

(57) ABSTRACT

A cooling system may be operable to cool a battery pack or other device through a heat exchange operation supported, at least in part, with cycling of a coolant relative to a coldplate or other thermally conducting surface of the device and/or attached thereto. The system may include a coldplate operable to exchange heat with a battery pack; and a coolant tank operable to exchange heat with the coldplate, the tank having a channel for directing a coolant flow in a direction from an inlet of the tank to at least one outlet of the tank and an inlet accumulator between the inlet and a beginning of the channel, wherein the inlet accumulator is wider along the coolant flow direction than the channel and the inlet and having a sloped side leading towards the channel configured to pool the coolant flow prior to entry into the channel.

19 Claims, 6 Drawing Sheets

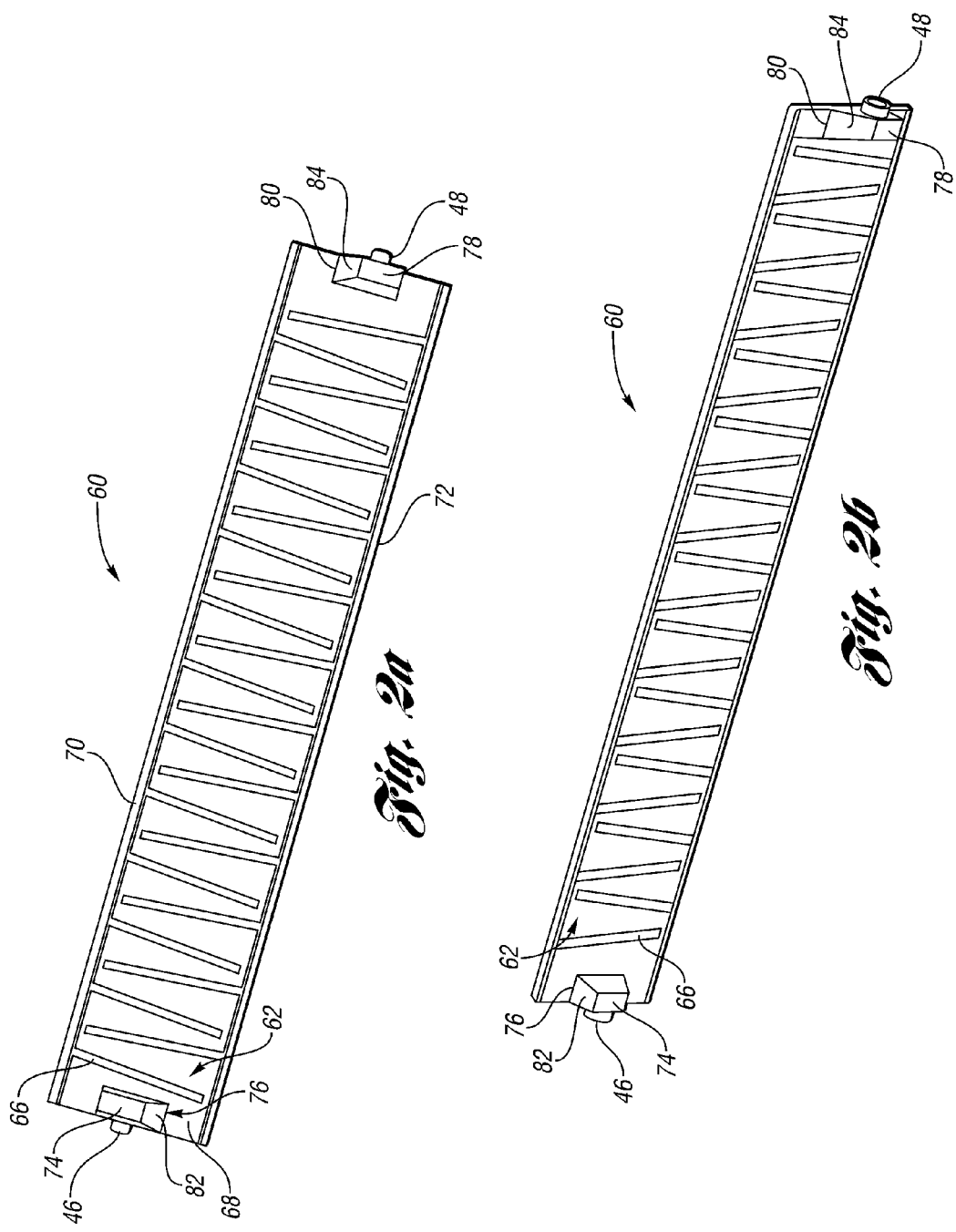

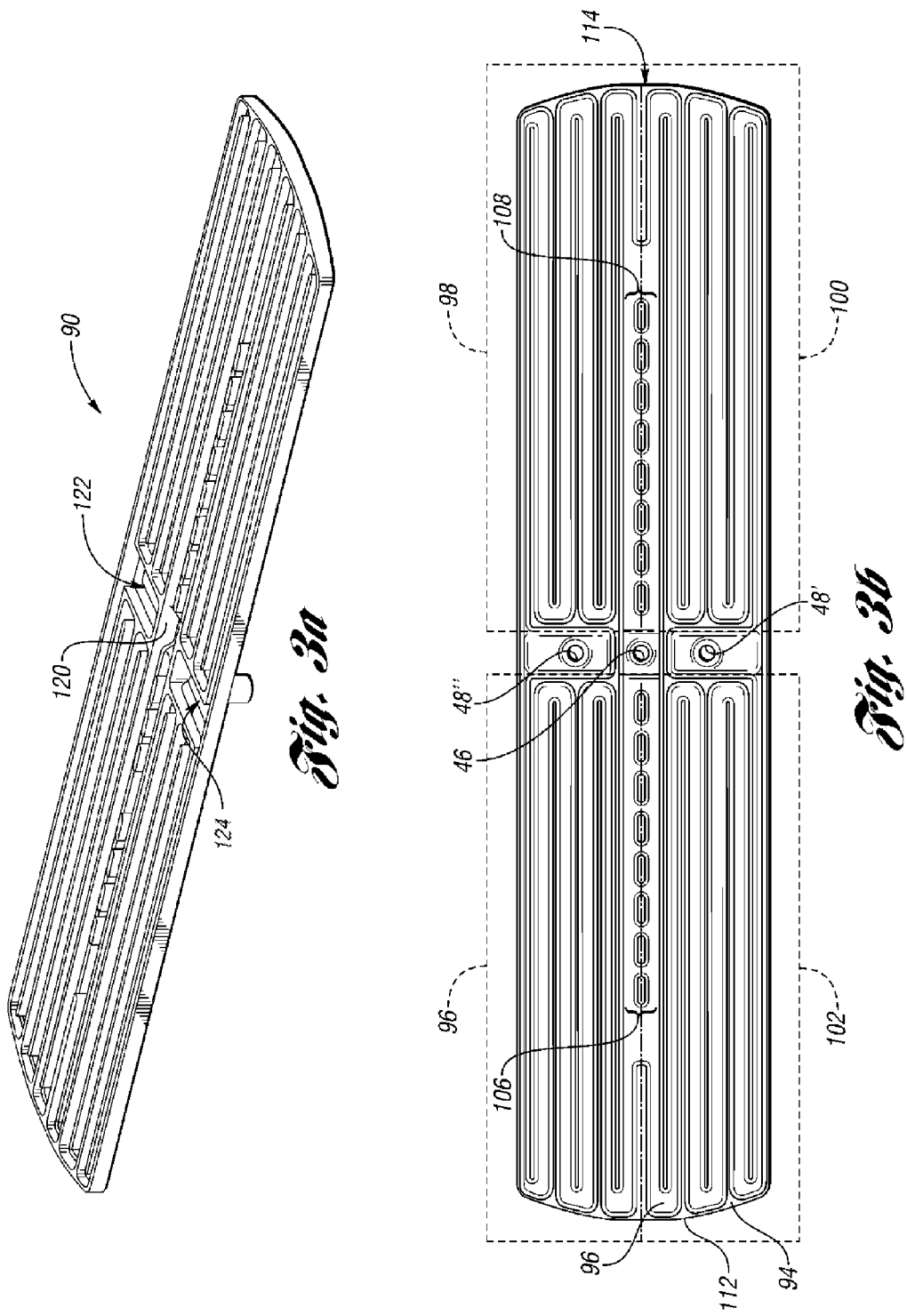

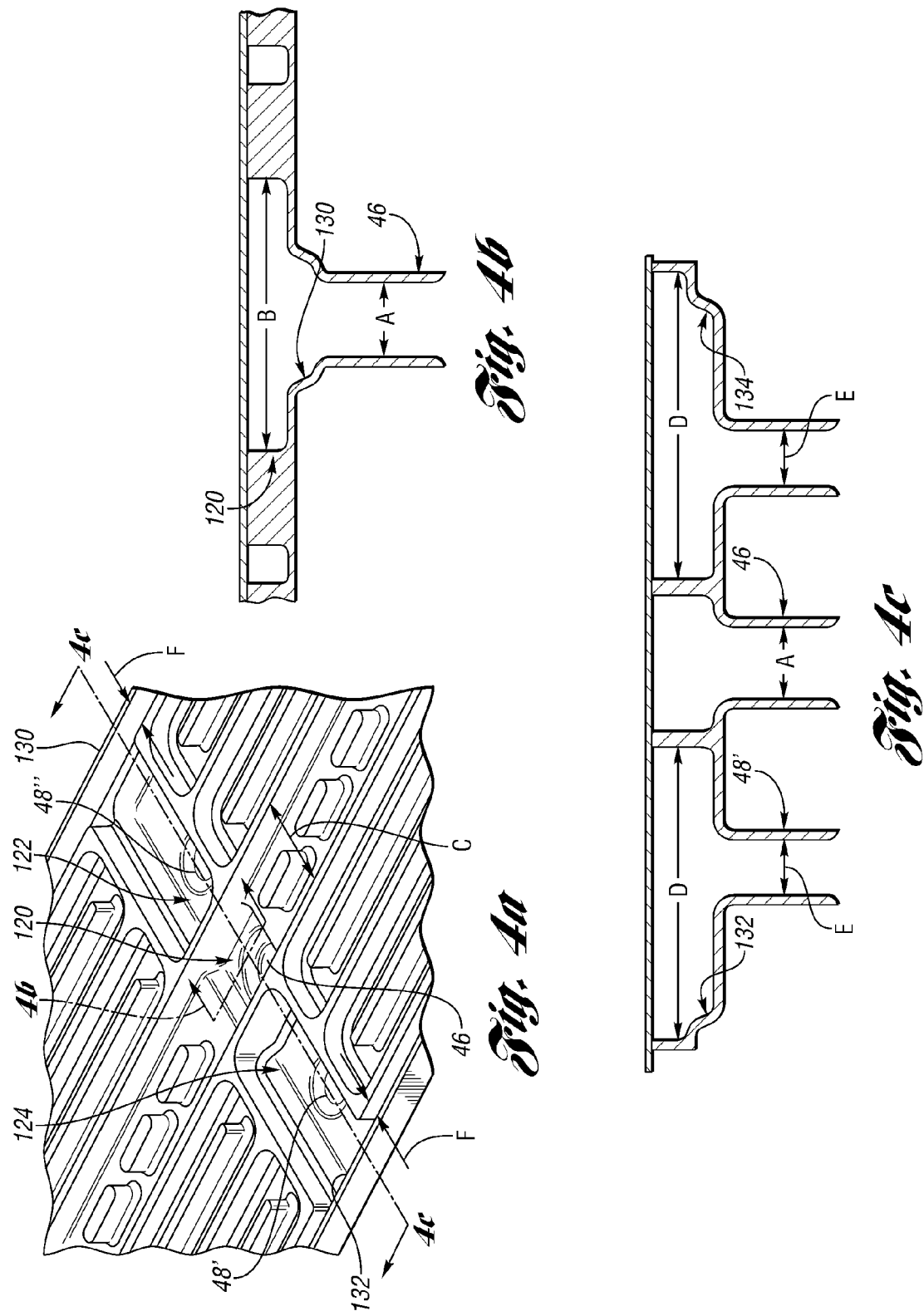

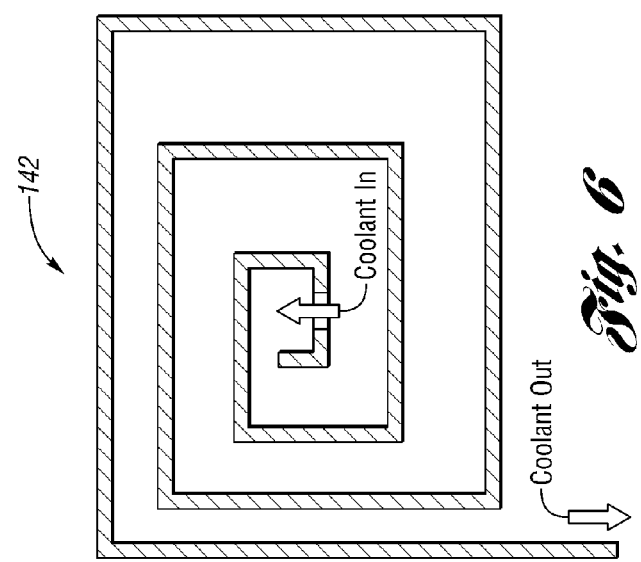
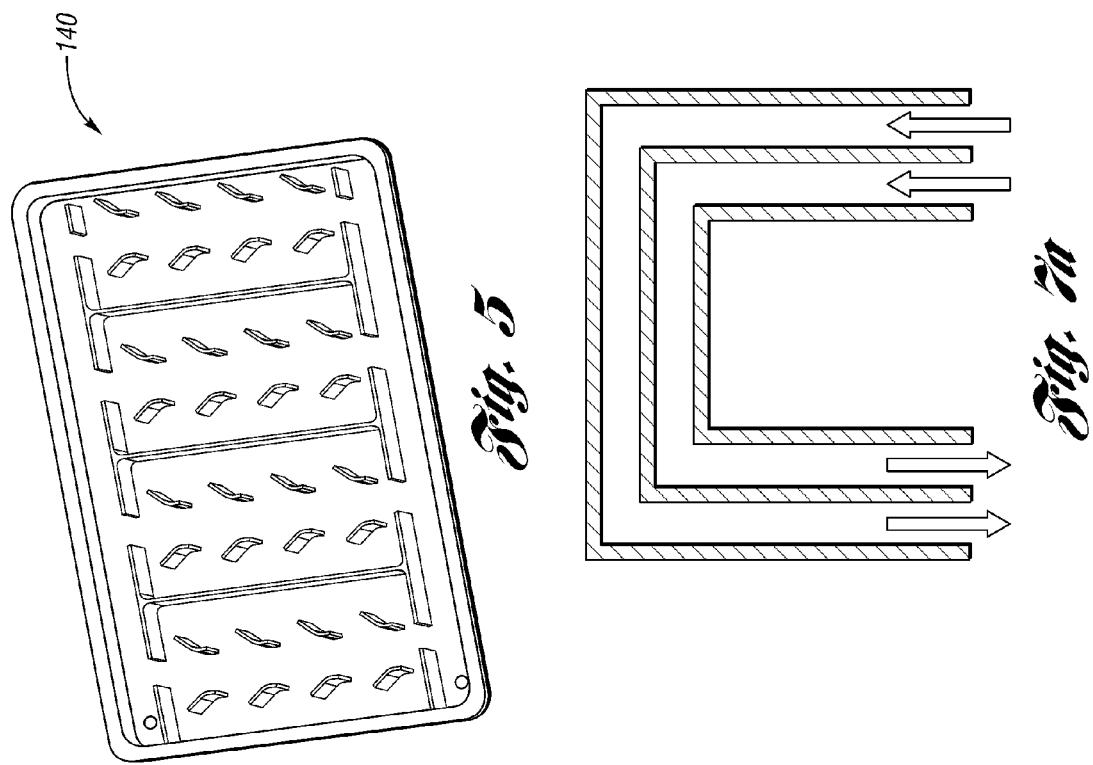

BATTERY PACK LIQUID CHANNEL AND COLDPLATE COOLING SYSTEM

TECHNICAL FIELD

The present invention relates to battery pack liquid cooling systems, such as but not limited to cooling systems suitable for use in cooling a Lithium-Ion (Li-Ion) battery used in electrically operable vehicles.

BACKGROUND

The use of a battery or grouping of batteries (battery pack) is common in vehicles and other devices. The battery pack can become heated during operation. Should the heating rise above desirable levels, the operation and/or capabilities of the battery pack and/or device may suffer. Accordingly, a need exists to provide a cooling system that is operable to cool or otherwise coolingly influence the battery pack to operate if possible, within a desired temperature ranges.

SUMMARY

One non-limiting aspect of the present invention contemplates to a battery pack liquid cooling system. The system may include: a coldplate operable to exchange heat with a battery pack; and a coolant tank operable to exchange heat with the coldplate, the coolant tank defining a channel for directing a coolant from an inlet to an outlet, the coolant tank including an inlet accumulator configured to pool the coolant prior to entry into the channel.

One non-limiting aspect of the present invention contemplates the inlet accumulator being configured to slow a velocity of the coolant received at the input prior to reaching the channel.

One non-limiting aspect of the present invention contemplates the coolant tank including an outlet accumulator configured to pool the coolant prior to entry into the outlet.

One non-limiting aspect of the present invention contemplates a cross-sectional area of each of the inlet and the outlet being less than a cross-sectional area of the corresponding inlet and outlet accumulator.

One non-limiting aspect of the present invention contemplates the inlet accumulator being configured to convert the coolant from a turbulent flow to a laminar flow.

One non-limiting aspect of the present invention contemplates the inlet accumulator being box-shaped with one side being sloped towards the channel.

One non-limiting aspect of the present invention contemplates the input accumulator including a port to the channel, the port having a cross-sectional area less than a cross-sectional area of the inlet accumulator.

One non-limiting aspect of the present invention contemplates the cross-sectional area of the port being less than a cross-sectional area of the inlet.

One non-limiting aspect of the present invention contemplates the inlet and the outlet being proximate a center of the coolant tank.

One non-limiting aspect of the present invention contemplates the outlet including a first outlet and a second outlet positioned on opposite sides of the first inlet.

One non-limiting aspect of the present invention contemplates the coolant flow channel proceeding in a serpentine pattern between the inlet and the first and second outlets.

One non-limiting aspect of the present invention contemplates the serpentine pattern being defined by a plurality of dividing walls, each dividing wall extending upwardly from a floor of the coolant tank to sealingly engage a bottom side of the coldplate.

One non-limiting aspect of the present invention contemplates a first portion of the plurality of dividing walls having a first length when measured lengthwise from the center to an outer edge of the coolant tank and a second portion of the plurality of the dividing walls having a second length when measured lengthwise from the center to the outer edge, the second length be less than 15% of the first length.

One non-limiting aspect of the present invention contemplates the second portion of the plurality of dividing walls being closer to the inlet than the first portion of the plurality of dividing walls when measured along the coolant flow channel from the inlet to the outlet.

One non-limiting aspect of the present invention contemplates a cooling system. The system may include: a coldplate operable to exchange heat with an object; and a coolant tank operable to exchange heat with the coldplate, the coolant tank defining a channel for directing a coolant from an inlet to at least one outlet, the coolant tank including an inlet accumulator configured to slow a velocity of the coolant received at the inlet prior reaching the channel.

One non-limiting aspect of the present invention contemplates the coolant tank including first and second outlets, wherein the channel divides proximate the input into corresponding first, second, third, and fourth serpentine patterns, the first and second serpentine patterns directing coolant to the first outlet and the third and fourth serpentine patterns directing coolant to the second outlet.

One non-limiting aspect of the present invention contemplates a battery pack liquid cooling system. The system may include: a coldplate operable to exchange heat with a battery pack; and a coolant tank operable to exchange heat with the coldplate, wherein the coolant tank includes a plurality of dividing walls arranged to define a channel for directing a coolant from an inlet to a first outlet and a second outlet, wherein the channel divides proximate the input into corresponding first, second, third, and fourth serpentine patterns, the first and second serpentine patterns directing coolant to the first outlet and the third and fourth serpentine patterns directing coolant to the second outlet.

One non-limiting aspect of the present invention contemplates the coolant tank including an accumulator between the inlet and the channel.

One non-limiting aspect of the present invention contemplates the accumulator being configured to slow a velocity of the coolant received at the inlet prior to entering the channel.

One non-limiting aspect of the present invention contemplates the accumulator being configured to pool coolant received at the inlet prior to entering the channel.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIGS. 2a-2b respectively illustrate top and bottom views of a coolant tank as contemplated by one non-limiting aspect of the present invention.

FIGS. 3a-3b and 4a-4c illustrate a coolant tank as contemplated by one non-limiting aspect of the present invention.

FIG. 5 illustrates a coolant tank as contemplated by one non-limiting aspect of the present invention.

FIG. 6 illustrates a coolant tank as contemplated by one non-limiting aspect of the present invention.

FIGS. 7a-7b illustrate a coolant tank as contemplated by one non-limiting aspect of the present invention

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
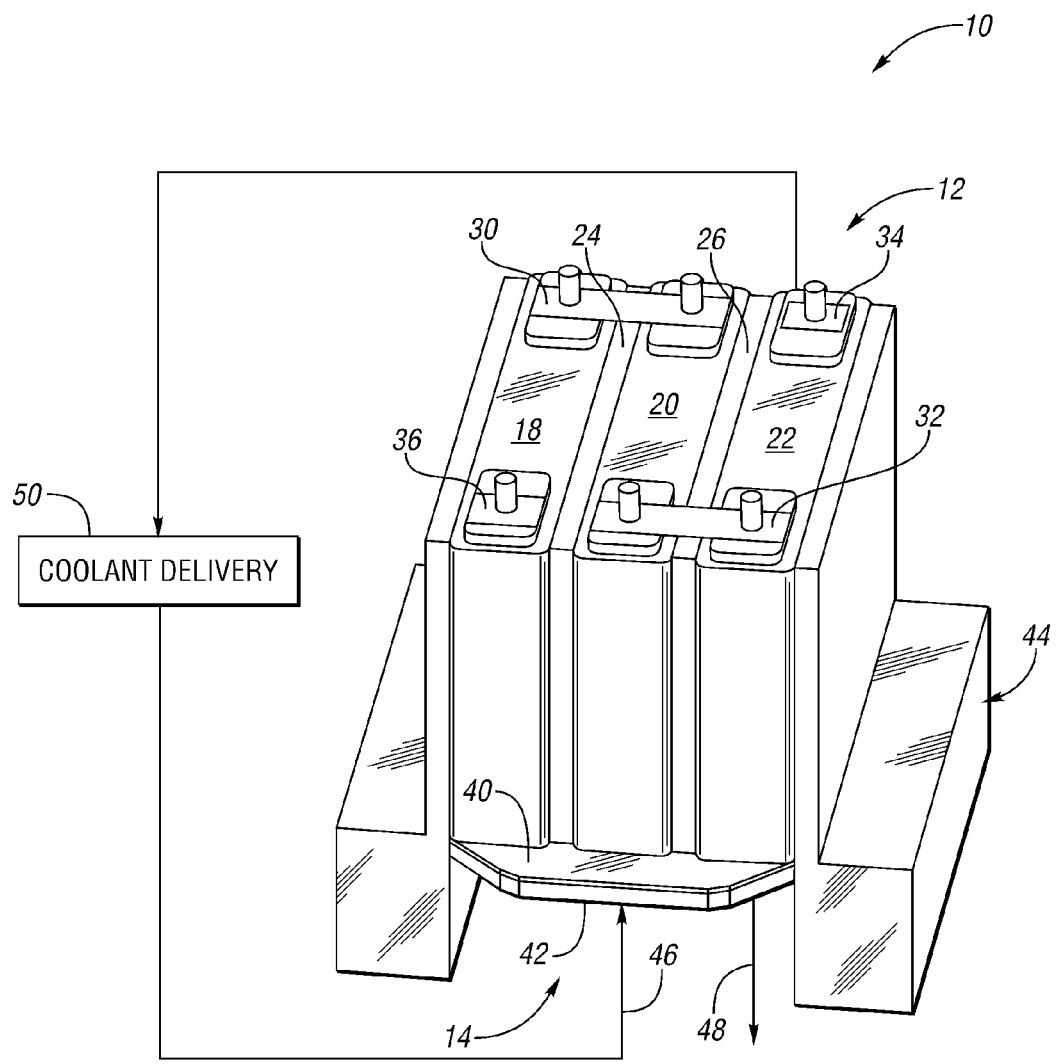
FIG. 1 illustrates a system having a battery pack cooled with a liquid cooling system as contemplated by one non-limiting aspect of the present invention.

FIG. 1 illustrates a system 10 having a battery pack 12 cooled with a liquid cooling system 14 as contemplated by one non-limiting aspect of the present invention. The present invention is predominately described with respect to the liquid cooling system 14 being configured to facilitate cooling of the battery pack 12 for exemplary and non-limiting purposes. The present invention fully contemplates the liquid cooling system 14 being adapted to facilitate cooling of other devices. The illustrated battery pack 12 is shown to be of the type commonly found in vehicles to facilitate electric drive assist. The battery pack 12 is comprised of a plurality of storage cells 18, 20, 22 arranged with spacers 24, 26 therebetween and electrically interconnected with a plurality of busbars 30, 32 and positive and negative terminals 34, 36.

The liquid cooling system 14 includes a coldplate 40 and a coolant tank 42. The coldplate is shown to be configured to engage, adjoin, connect, or otherwise establish a thermally conducting boundary with the battery pack 12. The coldplate 40 may be comprised of a thermally conducting material, such as but not limited to copper, aluminum, plastic, etc. The coldplate 40 may be attached directly to the battery 12 pack and/or indirectly by way of a battery pack support structure 44. Preferably, the coldplate 40 is positioned relative to the battery pack 12 to maximize its heat exchanging capabilities. The coolant tank 42 is shown to be configured to facilitate the directing a coolant between an inlet 46 and an outlet 48. The coolant travels through the coolant tank 42 in close proximity to the coldplate 40 to facilitate further heat exchange and cooling of the coldplate 40, and thereby, the battery pack 12. The liquid cooling system 14 and battery pack 12 may be included within an enclosure (not shown) or other non-illustrated arrangement.

A coolant delivery system 50 may be configured to facilitate cycling the coolant through the inlet 46 and the outlet 48. The coolant delivery system 50 may be configured to pump a liquid coolant. Optionally, the coolant delivery system 50 may be configured to cycle non-liquid fluids, however, it is believed a liquid coolant would provide a more cost-effective cooling process relative to non-liquid fluids. The coolant delivery system 50 may include a de-gassing bottle or other device to remove air/bubbles from the coolant. The coolant delivery system 50 may also be configured to control a velocity and/or pressure at which coolant is delivered to the input 46. The coolant delivery system 50 may include a controller (not shown) to control the coolant flow as a function of measured temperatures of the battery pack 12 and/or the coolant, such as to increase coolant flow in proportion to increases in temperature. The temperature based content can be performed in a step-wise, energy conservative fashion so that the desired temperature is maintained with the minimum amount of coolant flow, i.e., the coolant delivery system 50 may consume less energy when providing lower velocity/pressured coolant.

FIGS. 2a-2b respectively illustrate top and bottom views of a coolant tank 60 contemplated by one non-limiting aspect of the present invention. The coolant tank 60 includes a channel 62 for directing the coolant from the inlet 46 to the outlet 48. The coolant tank 60 includes a plurality of dividing walls 66 extending upwardly from a floor 68 to engage a bottom of the coldplate 40. The dividing walls 66 are shown to be arranged in a serpentine pattern between the inlet 46 and the outlet 48. This serpentine pattern beneficially limits a temperature gradient widthwise between top and bottom sides 70, 72 of the coolant tank 60. The coolant tank 60 is shown to include an inlet accumulator 74 between the inlet 46 and a beginning 76 of the channel 66 and an outlet accumulator 78 between an end 80 of the channel 66 and the outlet 46.

The inlet accumulator 74 may be configured to pool the coolant received at the inlet 46 prior to being dispensed to the channel 66. This pooling of the inlet accumulator 74 may be characterized by a velocity of the coolant received at the inlet 46 being slowed prior to entering the port/opening 76 to the channel 66. This may be helpful in converting the coolant received at the inlet 46 from a turbulent flow to a laminar flow, which may limit eddies or other disruptions from generating bubbles or otherwise inducing cavitation. The outlet accumulator 78 may function in a similar manner to limit continued distribution of turbulent flow created within the channel 66 being carried back to the coolant delivery system 50. The inlet and outlet accumulators 74, 76 may be generally box-shaped with a sloping side 82, 84 leading to the channel. The sloping sides 82, 84 can be provided to assist smoothing coolant flow through each accumulator 74, 76.

FIGS. 3a-3b illustrate a coolant tank 90 contemplated by one non-limiting aspect of the present invention. The coolant tank 90 includes an additional outlet such that the coolant is directed from the inlet 46 equally to each of a first and second outlet 48', 48". The inlet and outlets 46, 48', 48" are positioned proximate a center of the coolant tank 90. This central position is beneficially in centering the coldest coolant, i.e., that entering the inlet 46, with a center of the battery pack 12, which may help localize cooling relative the typically hottest portion of the battery pack 12. As shown in more detail in FIG. 3b, the coolant tank 90 may include a plurality of dividing walls 94 extending upwardly from a floor 96 to sealingly engage the coldplate 40. The dividing walls 94 may be arranged into first, second, third, and fourth serpentine patterned channels 96, 98, 100, 102 with the first and second patterns 96, 98 leading to the first outlet 48" and the third and fourth patterns 100, 102 leading to the second outlet 48'.

A portion 106, 108 of the dividing walls 94 closest to the inlet 46 may be island-shaped such they having a length, as measured lengthwise from one side 112 to the other side 114 of the coolant tank 90. The length of each island may be substantially less than the length of the other portion of dividing walls 94 that extend uninterrupted from the center to the sides 112, 114 to define each of the first, second, third, and fourth patterned channels 96, 98, 100, 102. One non-limiting aspect of the present invention contemplates the use of the island-shaped dividing walls 106, 108 in order to further localize maximum cooling proximate central portions of the battery pack 12 where heating is likely to be greater. The islands 106, 108 achieve this by exposing more surface area of the coolant tank 90 to the coolant than the longer dividing walls.

FIG. 4*a* illustrates an exploded view of the coolant tank 90 to better illustrate the area of the coolant tank 90 proximate the inlet 46 and outlets 48', 48" in more detail. Each of the inlet 46 and outlets 48', 48" are shown to include an optional inlet and outlet accumulator 120, 122, 124, similar to the accumulators described above. The inlet and outlet accumulators 120, 122, 124 may be configured to pool received coolant. The pooling may be characterized by a velocity of the received coolant being slowed prior to entering/leaving a port/opening to the channels 96, 98, 100, 102. This may be helpful in converting the coolant from a turbulent flow to a laminar flow, which may limit eddies or other disruptions from generating bubbles or otherwise inducing cavitation. The inlet and outlet accumulators 120, 122, 124 may be generally box-shaped with a sloping side 130, 132, 134 engaging to the channels 96, 98, 100, 102. The sloping sides 130, 132, 134 can be provided to assist smoothing coolant flow through each accumulator 120, 122, 124.

FIG. 4*b* illustrates a partial cross-section as taken lengthwise through the inlet 46. This view illustrates a cross-sectional area A of the inlet 46, as measured lengthwise from side to side 112, 114 of the coolant tank 90 being less than a cross-sectional area B of the inlet accumulator 120. It also illustrates the cross-sectional area A of the inlet accumulator 120 being greater than a cross-sectional area C of the channel as measured widthwise from top 130 to bottom 132 of the coolant tank 90. FIG. 4*c* illustrates a partial cross-section as taken widthwise through the inlet 46, the first outlet 48", and the second outlet 48'. This view illustrates a cross-sectional area E of the first and second outlets 48', 48", as measured widthwise from the top 130 to the bottom 132 of the coolant tank 90, having cross-sectional area E less than the corresponding cross-sectional area D of the accumulators 122, 124. It also illustrates the cross-sectional area D of the accumulators 122, 124 being greater than a cross-sectional area F of the associated channel as measured in the same direction widthwise from the top to the bottom 130, 132 of the coolant tank 90.

Figure 7B:
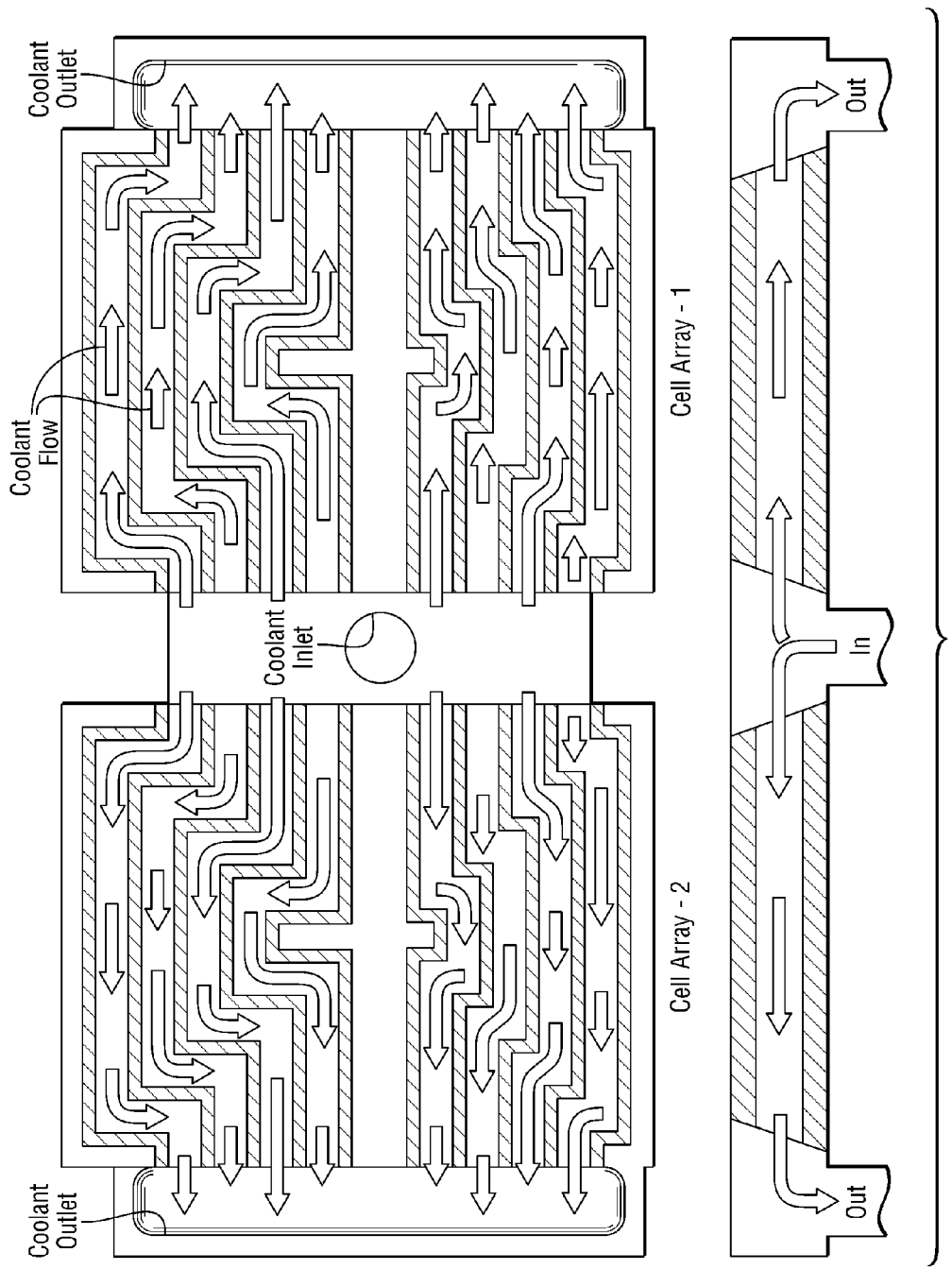

FIG. 5 illustrates a coolant tank 140 in accordance with one non-limiting aspect of the present invention. The coolant tank 140 is shown to include a plurality of dividing walls arranged into a baffled configuration to guide the coolant from an inlet to an outlet. While not shown, the inlet and outlet may include accumulators similar to those described above. FIG. 6 illustrates a coolant tank 142 in accordance with one non-limiting aspect of the present invention. The coolant tank is shown to include a plurality of dividing walls arranged into a spiraled configuration to guide the coolant from an inlet to an outlet. While not shown, the inlet and outlet may include accumulators similar to those described above. FIGS. 7*a*-7*b* illustrates a coolant tank 144 in accordance with one non-limiting aspect of the present invention. The coolant tank is shown to include a plurality of dividing walls arranged into a plurality of concentric squares configuration to guide the coolant from an inlet to one of two outlets.

As supported above, one non-limiting aspect of the present invention contemplate a liquid cooling system that is operable to facilitate thermal management of Li-Ion battery pack. The present invention may be helpful in limiting the number of coolant line connections (e.g., 2-3 connections), reducing the chances of coolant leaks, and sealing/isolating the cooling system from a high voltage system, and limiting cost and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery pack liquid cooling system comprising:
   a coldplate operable to exchange heat with a battery pack; and
   a coolant tank operable to exchange heat with the coldplate, the coolant tank having a channel for directing a coolant flow in a direction from an inlet of the coolant tank to at least one outlet of the coolant tank and an inlet accumulator between the inlet and a beginning of the channel, wherein the inlet accumulator is wider along the coolant flow direction than the channel and the inlet, and having a sloped side leading towards the channel such that cross-sectional area of the inlet accumulator increases along the coolant flow direction, the inlet accumulator configured to pool the coolant flow prior to entry into the channel.

2. The battery pack liquid cooling system of claim 1 wherein the inlet accumulator is configured to slow a velocity of the coolant received at the inlet prior to reaching the channel.

3. The battery pack liquid cooling system of claim 1 wherein the coolant tank includes an outlet accumulator between an end of the channel and the at least one outlet, the outlet accumulator wider along the coolant flow direction than the channel and the least one outlet and configured to pool the coolant flow prior to entry into the at least one outlet.

4. The battery pack liquid cooling system of claim 3 wherein a cross-sectional area of the inlet along the coolant flow direction is less than the cross-sectional area of the inlet accumulator along the coolant flow direction, and a cross-section area of the at least one outlet along the coolant flow direction is less than a cross-sectional area of the outlet accumulator along the coolant flow direction.

5. The battery pack liquid cooling system of claim 1 wherein the inlet accumulator is configured to convert the coolant from a turbulent flow to a laminar flow.

6. The battery pack liquid cooling system of claim 1 wherein the inlet accumulator is box-shaped, with one side of the box-shaped inlet accumulator being the sloped side leading towards the channel.

7. The battery pack liquid cooling system of claim 1 wherein the inlet includes a port to the channel, the port having a cross-sectional area less than a cross-sectional area of the inlet accumulator.

8. The battery pack liquid cooling system of claim 7 wherein the cross-sectional area of the port is less than a cross-sectional area of the inlet.

9. The battery pack liquid cooling system of claim 1 wherein the inlet and the at least one outlet are positioned at a center of the coolant tank.

10. The battery pack liquid cooling system of claim 9 wherein the at least one outlet includes a first outlet and a second outlet positioned on opposite sides of the inlet.

11. The battery pack liquid cooling system of claim 10 wherein the channel is configured to cause the coolant flow to proceed in a serpentine pattern between the inlet and the first and second outlets.

12. The battery pack liquid cooling system of claim 11 wherein the serpentine pattern is defined by a plurality of dividing walls, each dividing wall extending upwardly from a floor of the coolant tank to sealingly engage a bottom side of the coldplate.

13. The battery pack liquid cooling system of claim 12 wherein a first portion of the plurality of dividing walls have a first length when measured lengthwise from the center to an outer edge of the coolant tank and a second portion of the plurality of the dividing walls have a second length when measured lengthwise from the center to the outer edge, the second length be less than 15% of the first length.

14. The battery pack liquid cooling system of claim 13 wherein the second portion of the plurality of dividing walls are closer to the inlet than the first portion of the plurality of dividing walls when measured along the channel from the inlet to the outlet.

15. A cooling system comprising:
 a battery-pack coldplate; and
 a coolant tank operable to exchange heat with the battery-pack coldplate, including
  an inlet accumulator having an inlet and a sloped side such that cross-sectional area of the inlet accumulator increases along a coolant flow direction, and
  a channel extending from the inlet accumulator toward an outlet, the inlet accumulator being greater in cross-sectional area along the coolant flow direction than the channel and the inlet.

16. The cooling system of claim 15 further comprising a second outlet, wherein the channel divides the inlet into corresponding first, second, third, and fourth serpentine patterns, the first and second serpentine patterns directing coolant to the outlet and the third and fourth serpentine patterns directing coolant to the second outlet.

17. A battery pack liquid cooling system comprising:
 a coldplate operable to exchange heat with a battery pack; and
 a coolant tank operable to exchange heat with the coldplate, wherein the coolant tank includes a plurality of dividing walls arranged to define a channel for directing a coolant flow in a direction from an inlet to a first outlet and a second outlet and an inlet accumulator between the inlet and a beginning of the channel, the inlet accumulator being wider than the channel along the coolant flow direction, and having a sloped side extending outward from the inlet such that cross-sectional area of the inlet accumulator increases along the coolant flow direction, the inlet accumulator configured to smooth the coolant flow prior to entry into the channel, wherein the channel divides the inlet into corresponding first, second, third, and fourth serpentine patterns, the first and second serpentine patterns directing coolant to the first outlet and the third and fourth serpentine patterns directing coolant to the second outlet.

18. The battery pack liquid cooling system of claim 17 wherein the inlet accumulator is configured to slow a velocity of the coolant received at the inlet prior to entering the channel.

19. The battery pack liquid cooling system of claim 17 wherein the inlet accumulator is configured to pool coolant received at the inlet prior to entering the channel.

\* \* \* \* \*